United States Patent
Xie et al.

(10) Patent No.: US 11,045,060 B2
(45) Date of Patent: Jun. 29, 2021

(54) ROBOT AND ROBOT CONTROL METHOD

(71) Applicants: BEIJING XIAOMI MOBILE SOFTWARE CO., LTD., Beijing (CN); BEIJING ROCKROBO TECHNOLOGY CO., LTD., Beijing (CN)

(72) Inventors: Haojian Xie, Beijing (CN); Yongfeng Xia, Beijing (CN)

(73) Assignees: BEIJING XIAOMI MOBILE SOFTWARE CO., LTD., Beijing (CN); BEIJING ROCKROBO TECHNOLOGY CO., LTD., Beijing (CN)

(*) Notice: Subject to any disclaimer, the term of this patent is extended or adjusted under 35 U.S.C. 154(b) by 200 days.

(21) Appl. No.: 16/236,559

(22) Filed: Dec. 30, 2018

(65) Prior Publication Data
US 2019/0133402 A1  May 9, 2019

Related U.S. Application Data

(63) Continuation of application No. PCT/CN2017/083111, filed on May 4, 2017.

(30) Foreign Application Priority Data

Aug. 30, 2016 (CN) .......................... 201610781395.2

(51) Int. Cl.
  *G01C 22/00* (2006.01)
  *G05D 1/00* (2006.01)
  (Continued)

(52) U.S. Cl.
  CPC ......... *A47L 11/4061* (2013.01); *A47L 9/2852* (2013.01); *A47L 11/24* (2013.01);
  (Continued)

(58) Field of Classification Search
  CPC ...... A47L 11/4061; A47L 11/24; A47L 11/40; A47L 2201/04; A47L 9/2852; B25J 9/16;
  (Continued)

(56) References Cited

U.S. PATENT DOCUMENTS

2016/0103451 A1* 4/2016 Vicenti ............... A47L 11/4066
 700/259
2016/0282870 A1* 9/2016 Yamamura ........... G05D 1/0274
(Continued)

FOREIGN PATENT DOCUMENTS

CN   103251354 A   8/2013
JP   2006079157 A   3/2006
(Continued)

OTHER PUBLICATIONS

EP17844915.3—Search report dated Feb. 3, 2020.
(Continued)

*Primary Examiner* — Mahmoud S Ismail
(74) *Attorney, Agent, or Firm* — Syncoda LLC; Feng Ma

(57) ABSTRACT

A robot includes a controller configured to: detect a virtual wall signal; identify a virtual wall according to a signal threshold and the virtual wall signal; and when the virtual wall is identified, adjust the signal threshold, and control the robot to travel along an outer side of the virtual wall according to an adjusted signal threshold and the virtual wall signal, such that a driving wheel of the robot is located at the outer side of the virtual wall when the robot is traveling along the outer side of the virtual wall; wherein the outer side of the virtual wall is a side of the virtual wall within an active region of the robot.

18 Claims, 7 Drawing Sheets

(51) Int. Cl.
    *A47L 11/40*    (2006.01)
    *A47L 11/24*    (2006.01)
    *B25J 9/16*     (2006.01)
    *A47L 9/28*     (2006.01)
    *B25J 11/00*    (2006.01)
    *G05D 1/02*     (2020.01)
    *G05B 15/00*    (2006.01)
    *G05B 19/00*    (2006.01)

(52) U.S. Cl.
    CPC .............. *A47L 11/40* (2013.01); *B25J 9/16* (2013.01); *B25J 9/1666* (2013.01); *B25J 11/0085* (2013.01); *G05D 1/0088* (2013.01); *G05D 1/0276* (2013.01); *A47L 2201/04* (2013.01); *G05D 2201/0203* (2013.01)

(58) Field of Classification Search
    CPC ... B25J 9/1666; B25J 11/0085; G05D 1/0088; G05D 1/0276; G05D 1/0272; G05D 2201/0203; G05D 1/0234; G05D 1/0242
    USPC ............................................. 701/23; 700/259
    See application file for complete search history.

(56) References Cited

U.S. PATENT DOCUMENTS

2017/0135277 A1* 5/2017 Hiramatsu ............ G05D 1/0278
2020/0224441 A1* 7/2020 Witelson .............. G05D 1/0219

FOREIGN PATENT DOCUMENTS

| JP | 2006341341 A | 12/2006 |
| JP | 2010102603 A | 5/2010 |
| JP | 5973610 B1 | 8/2016 |
| KR | 20110005318 A | 1/2011 |

OTHER PUBLICATIONS

KR10-2018-7032460-OA dated Feb. 25, 2020.
OA in JP application 2018-559944 dated Oct. 4, 2019.
OA in CN application 201610781395.2 dated Mar. 19, 2018.

* cited by examiner

ROBOT AND ROBOT CONTROL METHOD

CROSS-REFERENCE TO RELATED APPLICATIONS

The present application is a continuation of, and claims priority to PCT/CN2017/083111 filed on May 4, 2017, which claims priority to Chinese Patent Application No. 201610781395.2, filed on Aug. 30, 2016. The disclosures of these applications are hereby incorporated by reference in their entirely.

BACKGROUND

Automated devices and appliances are becoming more and more popular in households. One such a device is a cleaning robot, which is a robot configured to perform a cleaning operation while automatically traveling in a certain region without user operations.

SUMMARY

The present disclosure relates to the field of smart home appliances, and more particularly, to a robot and a method for controlling a robot.

In an aspect, a robot is provided including a controller configured to: detect a virtual wall signal via a detection component; identify a virtual wall according to a signal threshold and the virtual wall signal during a traveling process of the robot; and when the virtual wall is identified, adjust the signal threshold, and control the robot to travel along an outer side of the virtual wall according to an adjusted signal threshold and the virtual wall signal, such that a driving wheel of the robot is located at the outer side of the virtual wall when the robot is traveling along the outer side of the virtual wall; in which the outer side of the virtual wall is a side of the virtual wall within an active region of the robot.

In some embodiments, the signal threshold is a first signal threshold, the adjusted signal threshold is a second signal threshold, and the second signal threshold is less than the first signal threshold.

In some embodiments, the controller is further configured to: control the robot to return back a predetermined distance and to travel along the outer side of the virtual wall when the virtual wall is identified; and adjust a traveling path of the robot according to a relation between the virtual wall signal and the second signal threshold when the robot is traveling along the outer side of the virtual wall.

In some embodiments, the controller is further configured to: detect whether the virtual wall signal reaches the second signal threshold; control the robot to travel away from the virtual wall when detecting that the virtual wall signal reaches the second signal threshold; and control the robot to travel towards the virtual wall when detecting that the virtual wall signal is less than the second signal threshold.

In some embodiments, the controller is further configured to: fit the traveling path according to a predetermined number of virtual wall signals collected, the traveling path being corresponding to a shape defined by the outer side of the virtual wall; and control the robot to travel along the traveling path and adjust the traveling path according to the virtual wall signal, when detecting that a difference between the virtual wall signal and the second signal threshold is within a predetermined range.

In some embodiments, the controller is further configured to: detect whether the virtual wall signal reaches the first signal threshold; and determine that the virtual wall is identified when detecting that the virtual wall signal reaches the first signal threshold.

In some embodiments, the controller is further configured to: execute again an act of identifying the virtual wall according to the signal threshold and the virtual wall signal when the robot completes traveling along the outer side of the virtual wall.

In some embodiments, the controller is further configured to: detect whether the virtual wall signal is less than the second signal threshold; and determine that the robot completes traveling along the outer side of the virtual wall when a duration in which the virtual wall signal is continuously detected as being less than the second signal threshold reaches a predetermined duration.

In some embodiments, the controller is further configured to: determine a maximum value of the virtual wall signal during the traveling process of the robot; and adjust the first signal threshold according to the maximum value of the virtual wall signal.

In some embodiments, the detection component includes at least one of a magnetometer, a Hall sensor, or an infrared sensor.

In some embodiments, the detection component is arranged behind a guide wheel of the robot with respect to a forward traveling direction.

In some embodiments, the robot is a cleaning robot.

In another aspect, a method for controlling a robot includes: detecting a virtual wall signal via a detection component; identifying a virtual wall according to a signal threshold and the virtual wall signal during a traveling process of the robot; and adjusting the signal threshold and controlling the robot to travel along an outer side of the virtual wall according to an adjusted signal threshold and the virtual wall signal, when the virtual wall is identified, such that a driving wheel of the robot is located at the outer side of the virtual wall when the robot is traveling along the outer side of the virtual wall; in which the outer side of the virtual wall is a side of the virtual wall within an active region of the robot.

In some embodiments, the signal threshold is a first signal threshold, the adjusted signal threshold is a second signal threshold, and the second signal threshold is less than the first signal threshold.

In some embodiments, controlling the robot to travel along the outer side of the virtual wall according to the adjusted signal threshold and the virtual wall signal includes: controlling the robot to return back a predetermined distance and to travel along the outer side of the virtual wall when the virtual wall is identified; and adjusting a traveling path of the robot according to a relation between the virtual wall signal and the second signal threshold when the robot is traveling along the outer side of the virtual wall.

In some embodiments, adjusting the traveling path of the robot according to the relation between the virtual wall signal and the second signal threshold includes: detecting whether the virtual wall signal reaches the second signal threshold; controlling the robot to travel away from the virtual wall when detecting that the virtual wall signal reaches the second signal threshold; and controlling the robot to travel towards the virtual wall when detecting that the virtual wall signal is less than the second signal threshold.

In some embodiments, adjusting the traveling path of the robot according to the relation between the virtual wall signal and the second signal threshold includes: fitting the traveling path according to a predetermined number of virtual wall signals collected, the traveling path being corresponding to a shape defined by the outer side of the virtual wall; and controlling the robot to travel along the traveling path and adjusting the traveling path according to the virtual wall signal, when detecting that a difference between the virtual wall signal and the second signal threshold is within a predetermined range.

In some embodiments, identifying the virtual wall signal according to the signal threshold and the virtual wall signal includes: detecting whether the virtual wall signal reaches the first signal threshold; and determining that the virtual wall is identified when detecting that the virtual wall signal reaches the first signal threshold.

In some embodiments, the method further includes: executing again an act of identifying the virtual wall according to the signal threshold and the virtual wall signal when the robot completes traveling along the outer side of the virtual wall.

In some embodiments, the method further includes: detecting whether the virtual wall signal is less than the second signal threshold; and determining that the robot completes traveling along the outer side of the virtual wall when a duration in which the virtual wall signal is continuously detected as being less than the second signal threshold reaches a predetermined duration.

In some embodiments, the method further includes: determining a maximum value of the virtual wall signal during the traveling process of the robot; and adjusting the first signal threshold according to the maximum value of the virtual wall signal.

In some embodiments, the detection component includes at least one of a magnetometer, a Hall sensor, or an infrared sensor.

In some embodiments, the detection component is arranged behind a guide wheel of the robot with respect to a forward traveling direction.

In another aspect, a non-transitory computer readable storage medium is provided having instructions stored therein, in which when the instructions are executed by a controller, the above method for controlling a robot is executed.

It is to be understood that, both the foregoing general description and the following detailed description describe only some embodiments by way of example, and are not restrictive of the present disclosure.

BRIEF DESCRIPTION OF THE DRAWINGS

In order to clearly illustrate the various embodiments provided in the present disclosure, the following are drawings that accompany the description of the embodiments.

It is noted that these drawings shall be interpreted to serve illustrating purposes only, and that these drawings may represent just some, but not all, of embodiments of the present disclosure. For those skilled in the art, other embodiments that are based on the structures as described below and illustrated in these drawings may become obvious. As such, these other embodiments shall be interpreted to be contained within the scope of the disclosure.

DETAILED DESCRIPTION

Figure 1A:
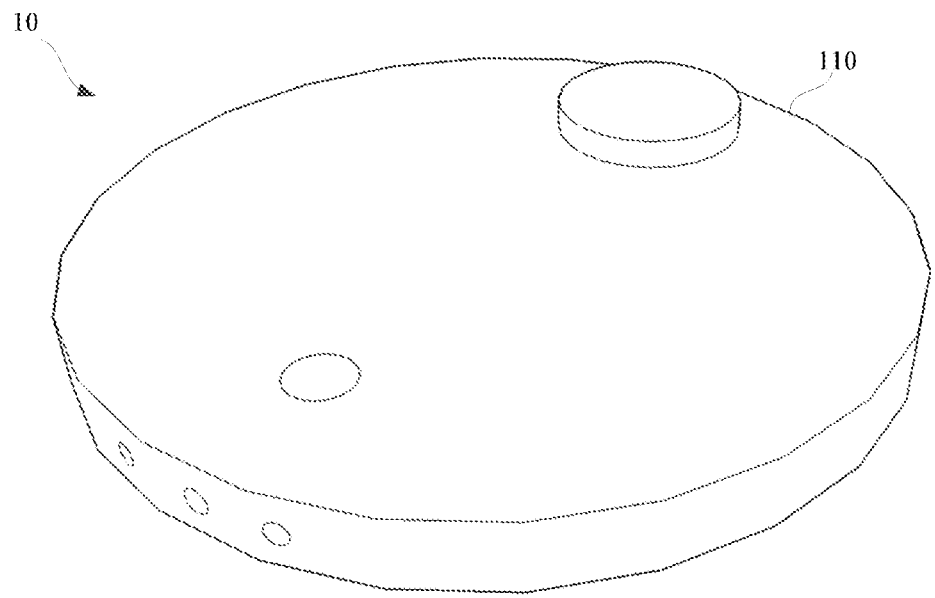
FIG. 1A is a schematic diagram illustrating a robot according to some embodiments of the present disclosure.

Descriptions will now be made in detail with respect to some embodiments, examples of which are illustrated in the accompanying drawings. The following description refers to the accompanying drawings in which the same numbers in different drawings may represent the same or similar elements unless otherwise represented. The implementations set forth in the following description of example embodiments do not represent all implementations consistent with the disclosure. Instead, they are merely examples of devices and methods consistent with aspects related to the disclosure as recited in the appended claims.

The inventors of the present disclosure have recognized that, in a region where the cleaning robot is located, there may be some areas which a user does not desire the cleaning robot to enter. One such an example a bathroom with water on the ground, where the cleaning robot may suffer from the water damage if entering the bathroom. Another example is a region having children's toys, where the cleaning robot may accidentally suck some toy parts into its dust box. Because there are generally no obstacles (such as doors and walls) arranged at boundaries around such regions to block the cleaning robot, the user can set a virtual wall for these regions to prevent the cleaning robot from entering these regions. For example, a virtual wall may be defined at an entrance to the bathroom.

The virtual wall can be defined by a virtual wall magnetic strip disposed on the ground. During a traveling process of the cleaning robot, a surrounding magnetic field strength may be detected by a detection component. When the detected magnetic field strength is greater than a preset magnetic threshold, it is determined that the cleaning robot arrives at the virtual wall. The cleaning robot may turn around and may work in an edge-along cleaning mode. When the magnetic threshold is set to be relatively large, the cleaning robot needs to travel very close to the virtual wall to enter the edge-along cleaning mode. Because the detection component is usually placed at the center of the cleaning robot, when the cleaning robot enters the edge-along cleaning mode, a driving wheel may actually already across the virtual wall magnetic strip and enters into the region that the user does not desire the cleaning robot to enter. As a result, the cleaning robot may still suffer from the water damage in the bathroom, or bring toy parts into the dust box.

On the other hand, if the magnetic threshold is set to be relatively small, although it may prevent the driving wheel from entering the regions, the cleaning robot may enter into the edge-along cleaning mode at a position far from the virtual wall. In some cases, the cleaning robot may take a weak magnetic item, such as stainless-steel furniture, as the virtual wall by mistake and thus enter into the edge-along cleaning mode. As a result, user interventions are often required. It is difficult to completely automate the cleaning in a complex environment.

In actual implementations, in order to prevent the driving wheel of the cleaning robot from entering the region which the user does not desire the cleaning robot to enter, two or more detection components may be disposed at peripheries of the cleaning robot. The plurality of detection components are configured to jointly identify the virtual wall. However, it may be difficult to configure the cleaning robot with the plurality of detection components, due to an increase of complexity of circuitry and an increase of manufacturing cost of the cleaning robot.

Figure 1B:
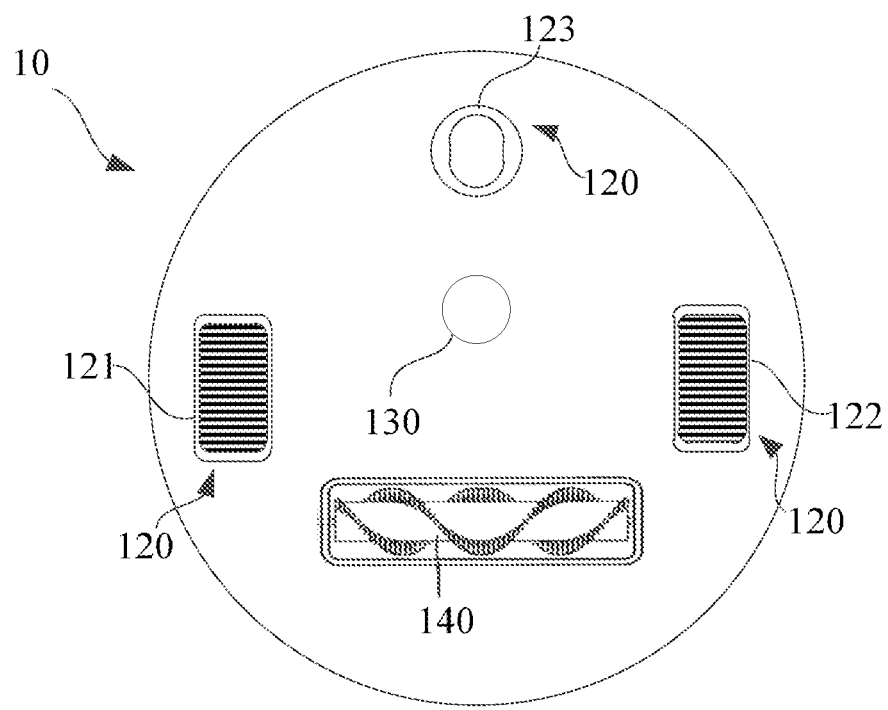
FIG. 1B is a schematic diagram illustrating a robot according to some embodiments of the present disclosure.

FIGS. 1A and 1B each is a schematic diagram illustrating a robot according to some example embodiments. FIG. 1A illustrates a top perspective view of a robot 10, while FIG. 1B illustrates a bottom view of the robot 10. As illustrated in FIGS. 1A and 1B, the robot 10 includes a robot body 110, a driving module or portion 120, a detection component or portion 130, a control module (not shown), and a storage component (not shown).

The various device components, units, blocks, or portions may have modular configurations, or are composed of discrete components, but nonetheless may be referred to as "modules" in general. In other words, the "modules" or "units" referred to herein may or may not be in modular forms.

The robot body 110 forms a housing of the robot 10, and is configured to accommodate other components. In some embodiments, the robot body 110 is flat-cylindrical-shaped.

The driving module 120 is configured to drive the robot 10 to travel forwards or backwards.

In some embodiments, the driving module 120 includes a pair of driving wheels 121 and 122 arranged on the bottom of the robot body 110, at two sides of the middle of the bottom. The driving wheels 121 and 122 are configured to drive the robot 10 to travel forwards or backwards.

In some embodiments, the driving module 120 further includes a guide wheel 123 arranged at the front of the robot body 110. The guide wheel 123 is configured to change a traveling direction of the robot while the cleaning robot is traveling.

The detection component 130 is configured to detect circumferential environment of the robot 10, so as to find a virtual wall included in the circumferential environment. The detection component 130 is further configured to send a detected virtual wall signal to the control module. In some embodiments, the detection component 130 includes at least one of a compass, a Hall sensor, or an infrared sensor. The detection component 130 is generally arranged on a circuit board inside the robot body 110. The detection component 130 is at middle of the front of the robot body. In some embodiments, the detection component 130 is arranged behind the guide wheel in the front of the robot body with respect of a forwards traveling direction. FIG. 1B illustrates that the detection component 130 is arranged behind the guide wheel and in front of the driving wheels 121 and 122 by examples.

The controller or control portion is arranged on the circuit board inside the robot body 110. The control module includes a processor. The processor may be configured to determine a current working status of the robot according to the virtual wall signal fed back from the compass, the Hall sensor and the infrared sensor. In some embodiments, the processor is a microcontroller unit (MCU) or an electronic operation processor (AP).

The storage component is arranged on the circuit board inside the robot body 110. The storage component includes a memory device. The memory device may be configured to store positional information and velocity information of the robot, and a real-time map drawn by the processor.

In some embodiments, the robot may further include other modules or components, or only include the above-mentioned modules or components, which is not limited in embodiments. The above robot is only used as an example for illustration.

In some embodiments, the robot discussed in embodiments is a cleaning robot. As illustrated in FIG. 1B, the cleaning robot generally further includes a main brush 140.

The main brush 140 is arranged at the bottom of the robot body 110. In some embodiments, the main brush 140 may be a drum-shaped rotating brush that may rotate with respect to a contact surface by a roller type. The main brush 140 is configured to perform a cleaning operation during a traveling process of the cleaning robot 10.

Figure 2:
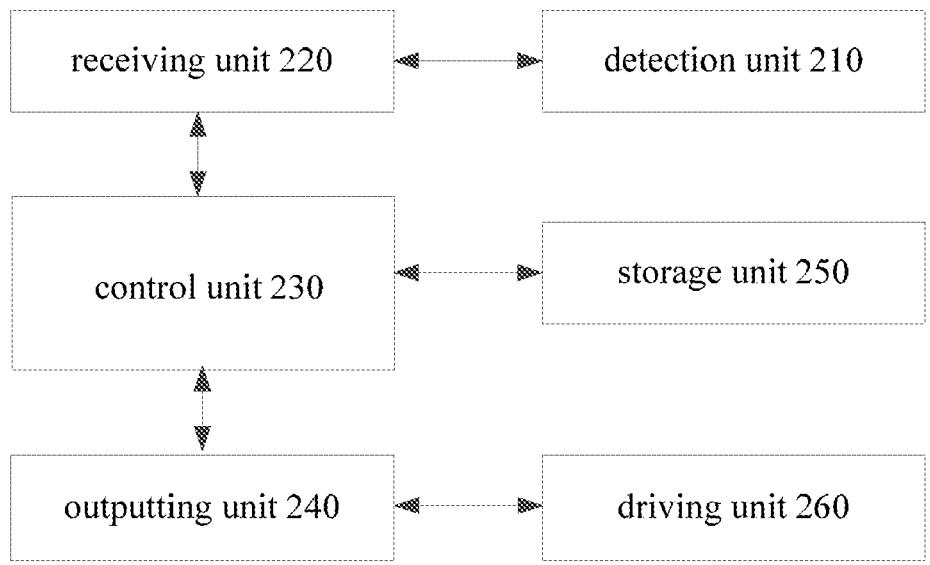
FIG. 2 is a block diagram illustrating a robot according to some embodiments of the present disclosure.

FIG. 2 is a block diagram illustrating a robot according to some embodiments. The robot includes a detection unit 210, a receiving unit 220, a controller 230, an outputting unit 240, a storage unit 250 and a driving unit 260.

The detection unit 210 is configured to detect a virtual wall signal during a traveling process of the robot.

The receiving unit 220 is configured to receive the virtual wall signal fed back by the detection unit 210.

The controller 230 is configured to identify a virtual wall according to the virtual wall signal received by the receiving unit 220 and a preset signal threshold, and to control an overall operation of the robot. When an instruction of traveling is received, the controller 230 is configured to control the robot to travel along a traveling path according to a preset traveling mode. Other instructions of a user received by the controller 230 are not elaborated in embodiments.

The outputting unit 240 is configured to output a control signal of the controller 230 to the driving unit 260.

The storage unit 250 is configured to store at least one instruction. The at least one instruction includes an instruction of performing a preset traveling mode along a preset traveling path, an instruction of drawing a real-time map, or the like. The storage unit 250 is further configured to store the preset signal threshold, data of self-location sensed by the robot during the traveling process, data related to virtual wall or data related to other obstacles.

The driving unit 260 is configured to control a driving direction and a rotational speed of the driving wheels according to the control signal of the controller 230.

In example embodiments, the controller 230 may be realized by one or more application specific integrated circuits (ASICs), digital signal processors (DSPs), digital signal processing devices (DSPDs), programmable logic devices (PLDs), field programmable gate array (FPGAs), controllers, microcontrollers, microprocessors or other electronic components, for executing the method for charging the robot provided in embodiments.

It is to be explained that, when the robot is the cleaning robot, a cleaning unit (not shown) connected to the outputting unit 240 is generally included. The cleaning unit is configured to receive the instruction of cleaning from the controller 230 through the outputting unit 240, and to control, according to the instruction of cleaning, the main brush to clean a contact surface with the main brush in a rotation manner during the traveling process of the cleaning robot.

The controller 230 is configured to detect a virtual wall signal by a detection component.

In addition, the controller 230 is configured to identify a virtual wall according to a signal threshold and the virtual wall signal during a traveling process of the robot.

Furthermore, the controller 230 is configured to adjust the signal threshold when the virtual wall is identified, and control the robot to travel along an outer side of the virtual wall according to an adjusted signal threshold and the virtual wall signal, such that a driving wheel of the robot is located at the outer side of the virtual wall during the traveling process of the robot along the outer side of the virtual wall.

The outer side of the virtual wall is a side of the virtual wall within an active region of the robot.

In some embodiments, the controller 230 is further configured to determine the signal threshold as a first signal threshold, and determine the adjusted signal threshold as a second signal threshold. The second signal threshold is less than the first signal threshold.

In some embodiments, the controller 230 is further configured to control the robot to return back a predetermined distance and to travel along the outer side of the virtual wall when the virtual wall is identified.

In addition, the controller 230 is configured to adjust a traveling path of the robot according to a relation between the virtual wall signal and the second signal threshold when the robot is traveling along the outer side of the virtual wall.

In some embodiments, the controller 230 is further configured to detect whether the virtual wall signal reaches the second signal threshold;

In addition, the controller 230 is further configured to control the robot to travel away from the virtual wall when it is detected that the virtual wall signal reaches the second signal threshold.

Furthermore, the controller 230 is configured to control the robot to travel towards the virtual wall when it is detected that the virtual wall signal is less than the second signal threshold.

In some embodiments, the controller 230 is further configured to fit the traveling path according to a predetermined number of virtual wall signals collected. The traveling path corresponds to a shape defined by the outer side of the virtual wall.

In addition, the controller 230 is further configured to control the robot to travel along the traveling path and adjust the traveling path according to the virtual wall signal, when a difference between the virtual wall signal and the second signal threshold is within a predetermined range.

In some embodiments, the controller 230 is further configured to detect whether the virtual wall signal reaches the first signal threshold.

In addition, the controller 230 is further configured to determine that the virtual wall is identified when it is detected that the virtual wall signal reaches the first signal threshold.

In some embodiments, the controller 230 is further configured to perform again an act of identifying the virtual wall according to the signal threshold and the virtual wall signal when the robot completes traveling along the outer side of the virtual wall.

In some embodiments, the controller 230 is further configured to detect whether the virtual wall signal is less than the second signal threshold.

In addition, the controller 230 is further configured to determine that the robot completes traveling along the outer side of the virtual wall when a duration in which the virtual wall signal is continuously detected as being less than the second signal threshold reaches a predetermined duration.

In some embodiments, the controller 230 is further configured to determine a maximum value of the virtual wall signal during the traveling process of the robot.

In addition, the controller 230 is further configured to adjust the first signal threshold according to the maximum value of the virtual wall signal.

In example embodiments, there is further provided a non-transitory computer readable storage medium including instructions, for example a storage unit 250 including instructions. The above instructions may be executed by the controller 230 to perform the method for controlling a cleaning robot according to above embodiments of the present disclosure. For example, the non-transitory computer readable storage medium may be a read only memory (ROM), a random-access memory (RAM), a compact disc read-only memory (CD-ROM), a tape, a floppy disk and optical data storage devices, etc.

Figure 3:
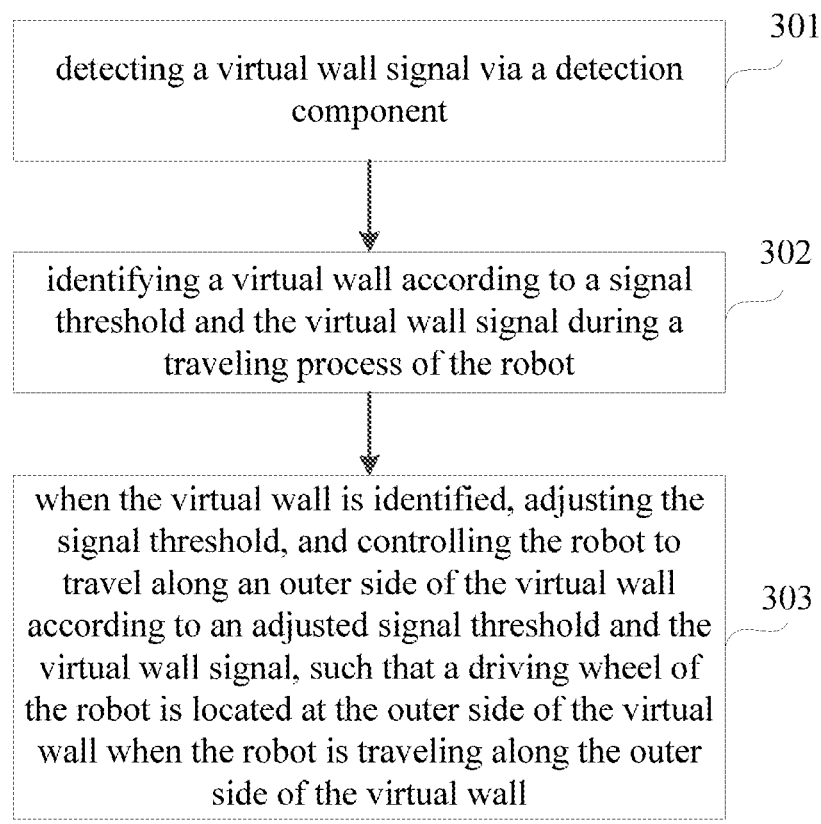
FIG. 3 is a flow chart illustrating a method for controlling a robot according to some embodiments.

FIG. 3 is a flow chart illustrating a method for controlling a robot according to some embodiments. Applying the method to the robot illustrated in FIGS. 1A and 1B is taken as an example for illustration in embodiments. The method for controlling a robot includes the followings.

In block 301, a virtual wall signal is detected by a detection component.

In block 302, a virtual wall is identified according to a signal threshold and the virtual wall signal during a traveling process of the robot.

In block 303, the signal threshold is adjusted when the virtual wall is identified, and the robot is controlled to travel along an outer side of the virtual wall according to an adjusted signal threshold and the virtual wall signal, such that a driving wheel of the robot is located at the outer side of the virtual wall when the robot is traveling along the outer side of the virtual wall.

The outer side of the virtual wall refers to a side of the virtual wall within an active region of the robot.

With the method for controlling a cleaning robot provided in embodiments of the present disclosure, by setting two different signal thresholds, the virtual wall is identified according to the signal threshold and the virtual wall signal detected via the detection component during the traveling process of the robot. When the virtual wall is identified, the signal threshold is adjusted, and the robot is controlled to travel along the outer side of the virtual wall according to the adjusted signal threshold and the virtual wall signal. When the virtual wall is identified and the robot is controlled to travel along the outer side of the virtual wall, a different signal threshold is used. A problem that the driving wheel of the robot enters the virtual wall when only a single large signal threshold is set, or user's interventions are required due to a misjudgment when only a single small signal threshold is set such that the robot cannot perform the cleaning operation automatically within a complex environment, may be solved. On the basis of accurate identification of the virtual wall, an effect may be realized that the driving wheel of the robot is located at the outer side of the virtual wall and does not enter an inner side of the virtual wall when the robot is traveling along the outer side of the virtual wall.

In embodiments of the present disclosure, the signal threshold and the adjusted signal threshold are two signal thresholds with different values set in advance. In embodiments, the signal threshold as the first signal threshold and the adjusted signal threshold as the second signal threshold is taken as an example for illustration.

Figure 4:
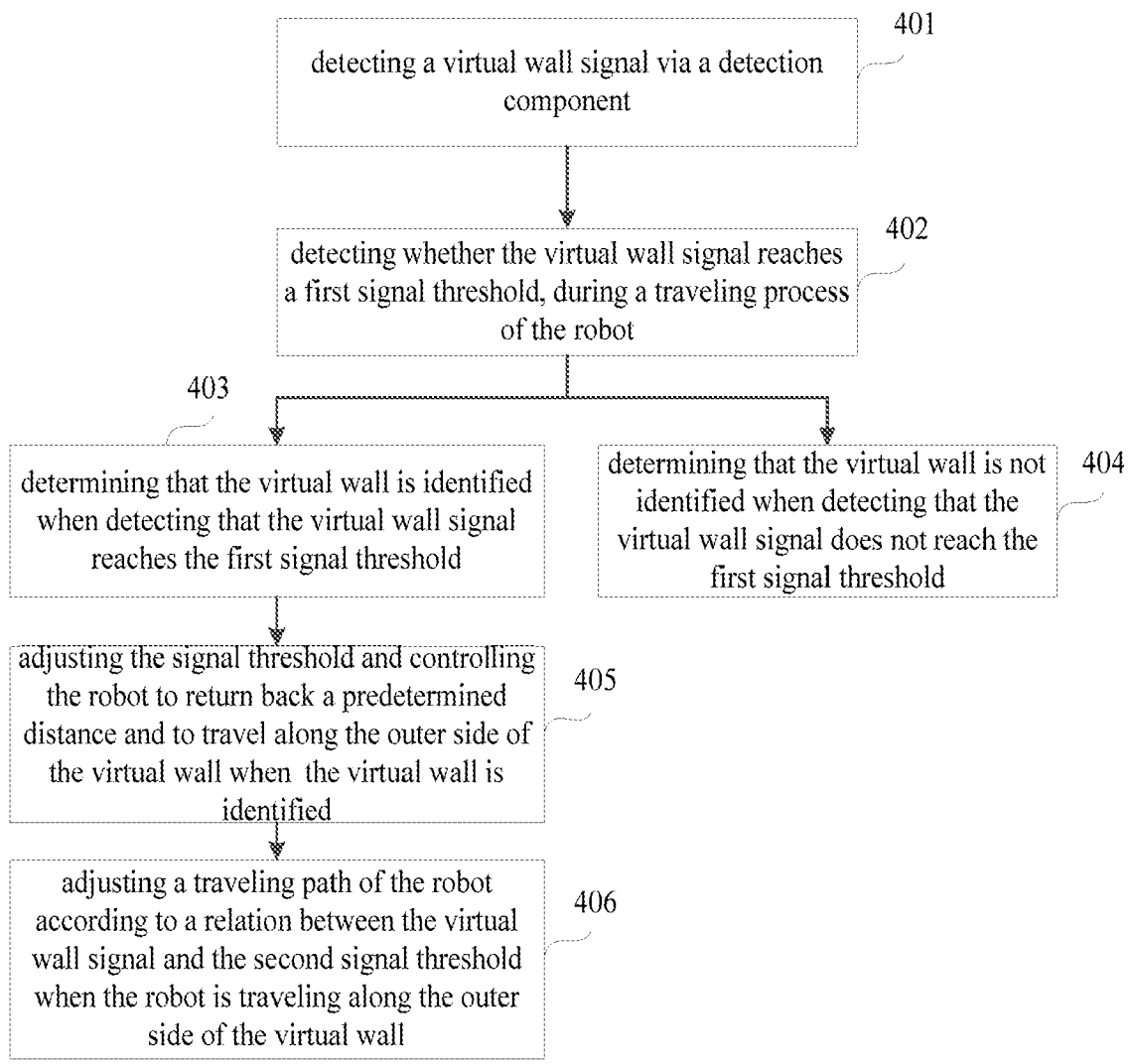
FIG. 4 is a flow chart illustrating a method for controlling a robot according to some other embodiments.

FIG. 4 is a flow chart illustrating a method for controlling a robot according to some embodiments. In embodiments, applying the method to the robot illustrated in FIGS. 1A and 1B is taken as an example for illustration. The method for controlling a robot includes the followings.

In block 401, the virtual wall signal is detected by the detection component.

In some embodiments, the virtual wall signal is detected using the detection component by the robot at a predetermined time interval. Duration of the predetermined time interval is a systemic value or a user customized value, which is not elaborated in embodiments.

The detection component generally corresponds to a type of the virtual wall. The virtual wall signal is a signal sensed by the detection component of the robot and corresponding to the type of the virtual wall. In some embodiments, when the virtual wall is a magnetic virtual wall defined by a magnetic strip and the detection component is a compass, the virtual wall signal is a magnetic field strength sensed by the compass. When the virtual wall is a magnetic virtual wall defined by a magnetic strip, the detection component may also be the Hall sensor, and the virtual wall signal may be a potential difference generated by the Hall sensor in the magnetic field. When the virtual wall is an infrared virtual wall defined by infrared lights and the detection component is the infrared sensor, the virtual wall signal may be an infrared signal sensed by the infrared sensor. An example that the virtual wall signal is the magnetic field strength is used for illustration.

In block 402, during the traveling process of the robot, it is detected whether the virtual wall signal reaches the first signal threshold.

The first signal threshold is generally a large empirical value. In some embodiments, when the virtual wall signal is the magnetic field strength, the first signal threshold is 2000 Gauss. In practical implementations, when the robot travels to a position such that a distance between the detection component and the magnetic strip is small enough, the detected virtual wall signal from the magnetic strip may reach the first signal threshold. For example, the robot travels a position such that the detection component is properly located right on the magnetic strip.

When the environment where the virtual wall is located varies, due to an influence of other objects located in the environment, the virtual wall signal generated by the virtual wall is generally different. For example, when the virtual wall signal is the magnetic field strength, terrestrial magnetic field strength sensed by the robot is different. When the robot is placed at different floors, the virtual wall signals detected by the robot are different even if the virtual wall is defined by a same magnetic strip.

As another example, a wire may generate a magnetic field. When the wire is laid under the floor provided with the magnetic strip, the virtual wall signal detected by the robot is different from the virtual wall signal detected from the magnetic strip when the wire is not laid under the floor. In addition, when self-performance of the virtual wall is changed, the virtual wall signal generated by the virtual wall may be different. For example, when the magnetic strip is used for a long time, magnetism of the magnetic strip may be weakened. As a result, the virtual wall signal detected by the robot may be gradually weakened. Therefore, the robot may adjust the first signal threshold according to the actually detected virtual wall signal, which includes the followings.

(1) A maximum value of the virtual wall signal is determined during the traveling process of the robot.

(2) The first signal threshold is adjusted according to the maximum value of the virtual wall signal.

When the first signal threshold is adjusted by the robot, the first signal threshold is adjusted to be slightly less than the maximum value of the virtual wall signal. Terms "slightly less than" refers to that a difference between the maximum value of the virtual wall signal and the first signal threshold is less than a predetermined threshold. The predetermined threshold is a systemic preset value or a user customized value. For example, the first signal threshold initiated by the robot is 2000 Gauss. When the robot is traveling, the maximum value of the virtual wall signal is detected as 1900 Gauss. The first signal threshold is thus adjusted by the robot to 1800 Gauss.

In block 403, when it is detected that the virtual wall signal reaches the first signal threshold, it is determined that the virtual wall is identified.

In addition to a signal generated by the virtual wall, the virtual wall signal detected by the robot may further include a signal corresponding to the type of the virtual wall and generated by other objects included in the environment where the robot is located. In general, the signal generated by the virtual wall is strong, while the signal generated by other objects is weak. For example, when the virtual wall is the magnetic virtual wall and the virtual wall signal detected by the robot is the magnetic field strength, the magnetic field strength detected is generally strong. In addition, stainless steel furniture in the environment where the robot is located is also magnetic, and the robot also detects the magnetic field strength of the stainless-steel furniture, but the detected magnetic field strength is generally weak.

In addition, since the signal generated by the virtual wall is generally strong, the virtual wall signal generated by the virtual wall can be detected when the robot is far away from the virtual wall. Therefore, under this case, it is unreasonable to adjust the traveling direction when it is determined that the virtual wall signal is identified by the robot.

Therefore, in order to avoid a misjudgment that other objects are determined as the virtual wall or avoid identifying the virtual wall too early, the virtual wall signal reaching the first signal threshold is determined as the signal generated by the virtual wall, it is determined that the virtual wall is identified and a block 405 is executed.

In block 404, when it is detected that the virtual wall signal does not reach the first signal threshold, it is determined that the virtual wall is not identified.

When it is detected that the virtual wall signal does not reach the first signal threshold, the robot continues to travel according to a current traveling direction.

In block 405, when the virtual wall is identified, the signal threshold is adjusted, and the robot is controlled to return back a predetermined distance and to travel along an outer side of the virtual wall.

When the virtual wall is identified by the robot, the signal threshold is switched from the first signal threshold to a second signal threshold. The second signal threshold is generally a relatively small empirical value. In some embodiments, when the virtual wall signal is the magnetic field strength, the second signal threshold is 800 Gauss. In practical implementations, the virtual wall signal strength detected by the robot at a certain distance from the virtual wall may be 800 Gauss, for example, the robot is at 10 cm from the virtual wall.

When the robot is traveling, the robot is at the outer side of the virtual wall. The outer side of the virtual wall refers to a side of the virtual wall within an active region of the robot. An inner side of the virtual wall refers to a side of the virtual wall within an inactive region of the robot. The inactive region of the robot refers to a region that the robot is not allowed to access. When the robot is the cleaning robot, the outer side of the virtual wall is a side of the virtual wall to be cleaned and the inner side of the virtual wall is a side of the virtual wall not to be cleaned.

Generally, when the robot travels a position such that the detection component is right on the magnetic strip, the virtual wall signal detected is greater than the first signal threshold. Since the guide wheel of the robot is in front of the detection component, when the virtual wall is identified by the robot, the guide wheel of the robot is generally located at the inner side of the virtual wall already. As illustrated in the top view of the robot of FIG. 5A, when the detection component 130 of the robot is right on the magnetic strip 50, the guide wheel 123 is already at the inner region of the virtual wall defined by the magnetic strip. If the robot is rotated directly, the driving wheel of the robot may enter the inner region of the virtual wall duo to the rotation. Therefore, when the virtual wall is identified by the robot, the robot returns back the predetermined distance. The predetermined distance is a systemic empirical value. In practical implementations, when the robot returns back the predetermined distance, the guide wheel of the robot returns to the outer side of the virtual wall. In the example illustrated in FIG. 5A, when the robot returns back the predetermined distance, the top view may be illustrated as FIG. 5B.

After the robot returns back the predetermined distance and after the robot is rotated by a predetermined degree to a predetermined direction, the robot travels along the outer side of the virtual wall. The predetermined direction and the predetermined degree are systemic predetermined value. The robot being rotated by the predetermined degree towards left is taken as an example for illustration in embodiments.

In some embodiments, when the robot is the cleaning robot, the cleaning robot returns back the predetermined distance and performs the cleaning operation along the outer side of the virtual wall.

In some embodiments, after the robot is rotated by the predetermined degree to the predetermined direction, the signal threshold is adjusted. Or, after the signal threshold is adjusted by the robot, the robot is rotated by the predetermined degree to the predetermined direction.

Figure 5A:
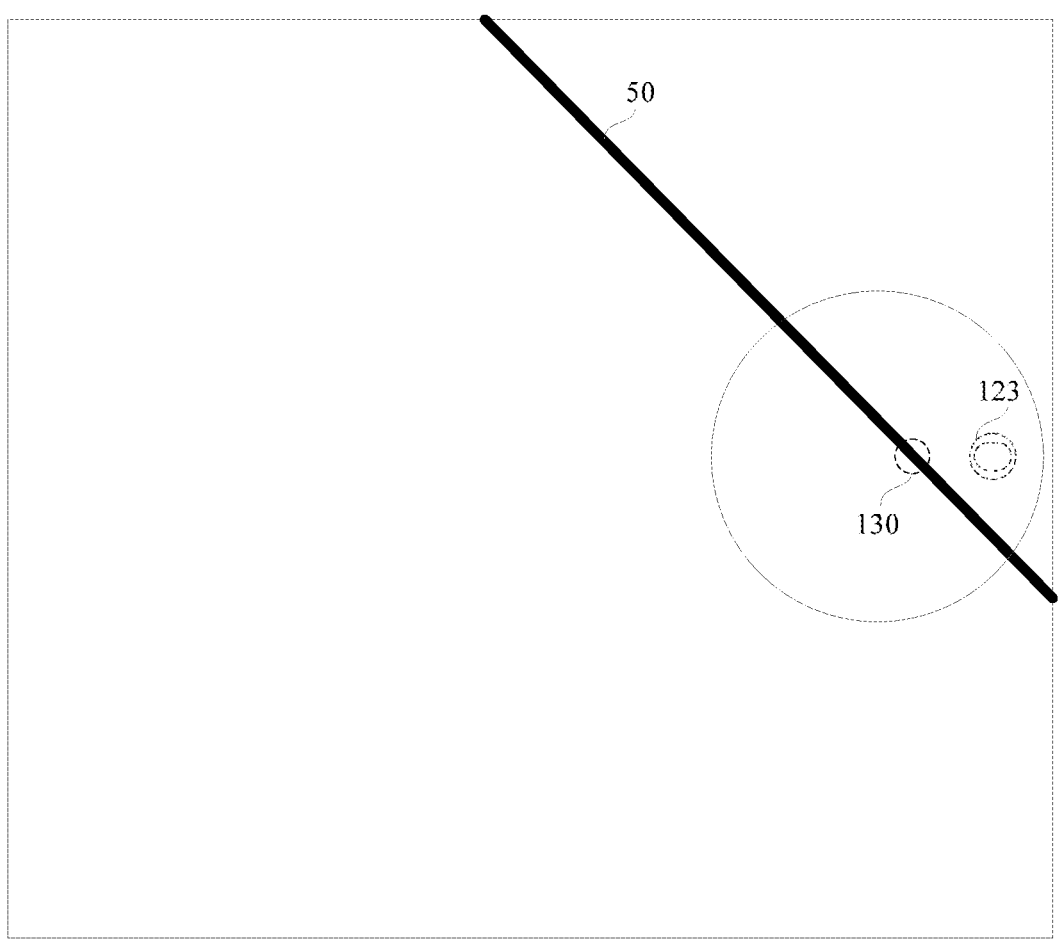
FIG. 5A is a schematic diagram illustrating a working process of a robot according to some other embodiments.
Figure 5B:
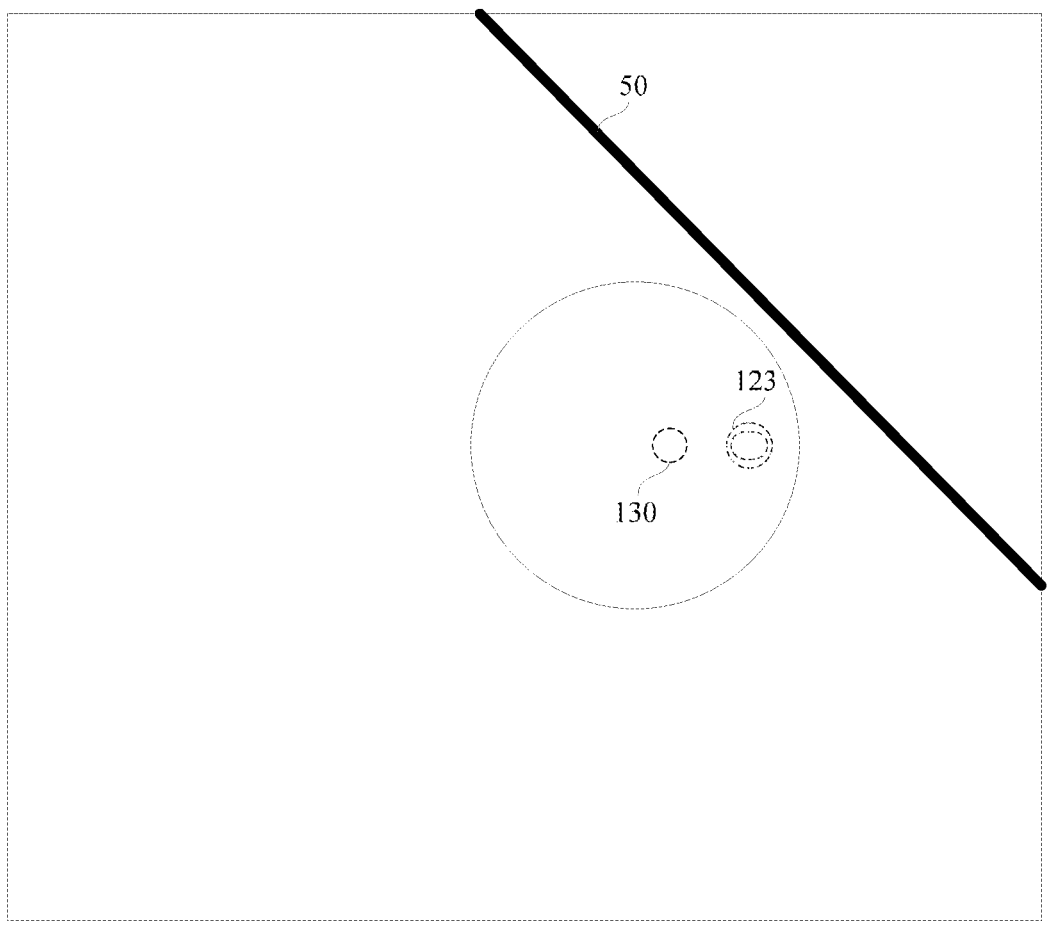
FIG. 5B is a schematic diagram illustrating a working process of a robot according to some other embodiments.

It is to be explained that, the virtual wall may have any shape. Shapes of the virtual wall illustrated in FIGS. 5A and 5B are examples, which are not limited in embodiments.

In block 406, when the robot is traveling along the outer side of the virtual wall, the traveling path of the robot is adjusted according to a relation between the virtual wall signal and the second signal threshold.

There are two implementations included in the block 406.

Figure 6:
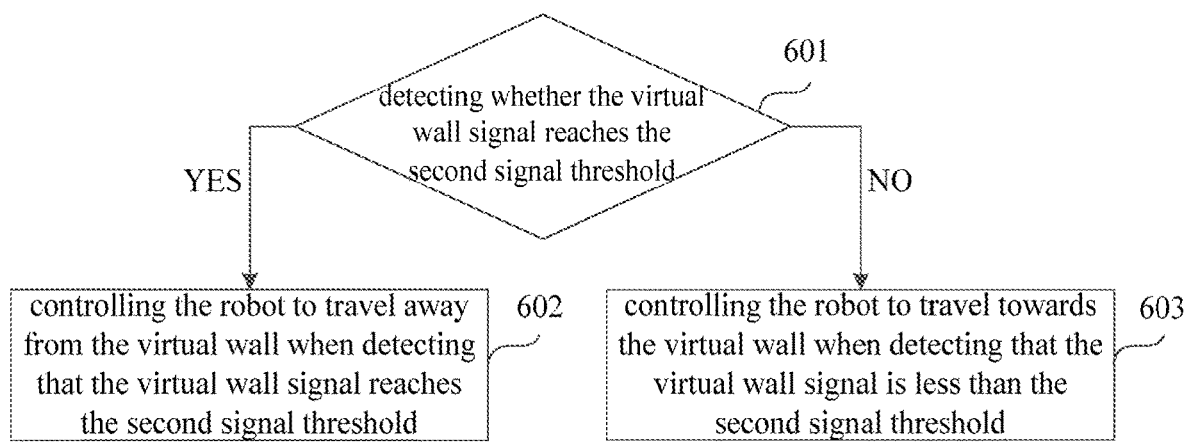
FIG. 6 is a flow chart illustrating a method for controlling a robot according to some other embodiments.

In a first possible implementation, the block 406 may be realized by followings, as illustrated in FIG. 6.

In block 601, it is detected whether the virtual wall signal reaches the second signal threshold.

In block 602, when it is detected that the virtual wall signal reaches the second signal threshold, the robot is controlled to travel away from the virtual wall.

When the robot detects that the virtual wall signal reaches the second signal threshold, the robot is rotated by the predetermined degree away from the virtual wall to travel. The predetermined degree is a systemic predetermined value or may be determined by the cleaning robot according to a difference between the virtual wall signal and the second signal threshold, which is not limited in embodiments.

In general, in block 405, when the robot is rotated to left and travels along an obstacle, the direction away from the virtual wall is left. When the robot is rotated to left and travels along the obstacle, the direction away from the virtual wall is right.

In block 603, when it is detected that the virtual wall signal is less than the second signal threshold, the robot is controlled to travel towards the virtual wall.

The implementations of the blocks may be combined with the above blocks, which are not elaborated in embodiments.

Figure 5C:
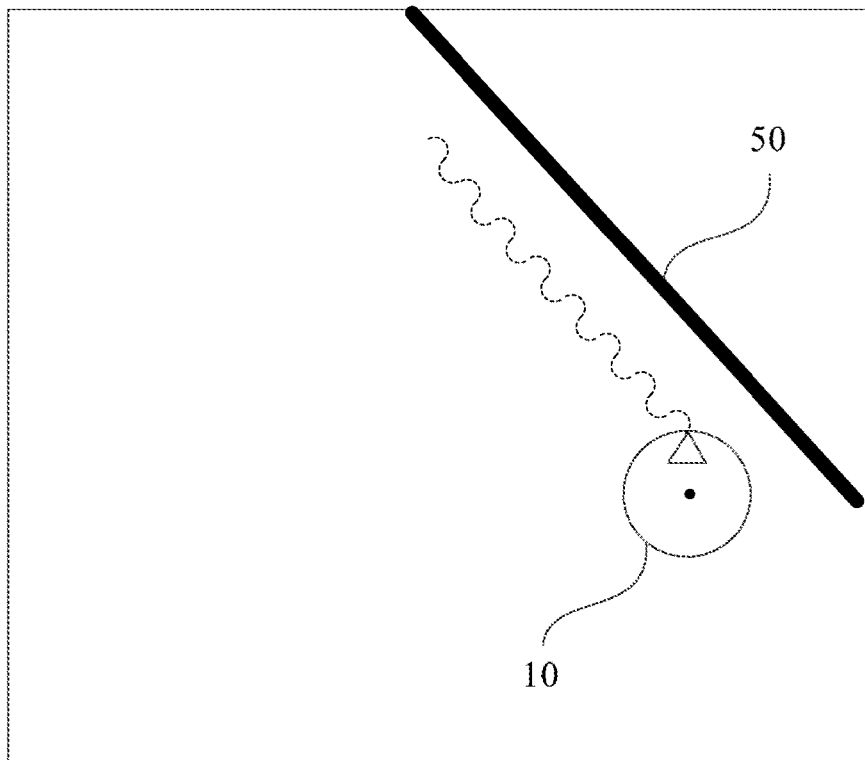
FIG. 5C is a schematic diagram illustrating a working process of a robot according to some other embodiments.

In an example, a schematic diagram that the robot travels along the virtual wall and performs the cleaning operation is illustrated as FIG. 5C. An orientation of a triangle on the robot 10 refers to the traveling direction of the robot 10. When the robot is traveling along the outer side of the virtual wall to perform the cleaning operation, the traveling direction may be continuously adjusted according to the virtual wall signal and the second signal threshold. The robot may travel essentially according to a wave-shaped line. A dotted line in FIG. 5C illustrates the traveling direction of the robot 10. It is to be explained that, although FIG. 5C illustrates that the robot travels along the wave-shaped line, in practical implementations, the traveling direction of the robot 10 may be adjusted at a very high frequency. For the user, it appears that the robot 10 travels according to a direct line along the virtual wall.

Figure 7:
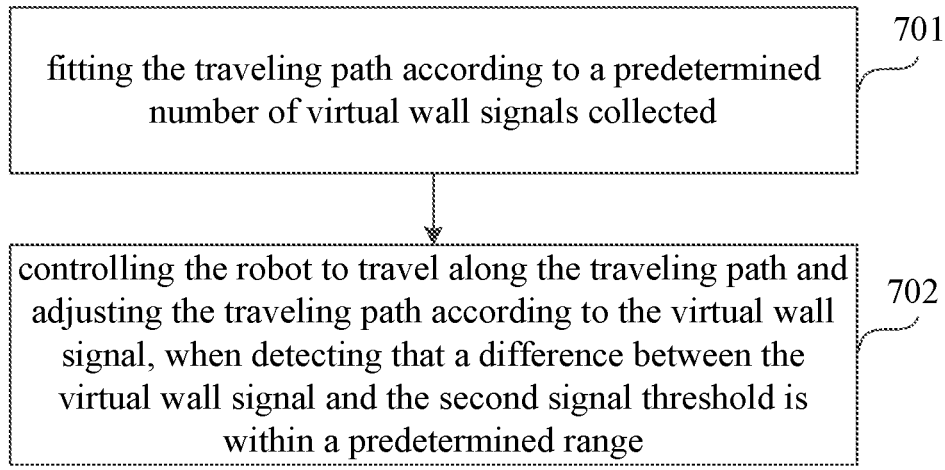
FIG. 7 is a flow chart illustrating a method for controlling a robot according to some other embodiments.

In a second possible implementation, the block 406 may be realized by the followings, as illustrated in FIG. 7.

In block 701, the traveling path is fit according to a predetermined number of virtual wall signals collected.

The traveling path corresponds to a shape formed by the outer side of the virtual wall. In general, the shape formed by the outer side of the virtual wall is regular. For example, when the virtual wall is the magnetic virtual wall defined by the magnetic strip, the virtual wall is generally direct-line-shaped or arc-shaped. In order to facilitate the robot to travel along the outer side of the virtual wall according to a smoother traveling trace, the traveling path may be obtained by fitting the collected several virtual wall signals. The predetermined number may be a systemic predetermined value or a customized value.

For example, taking the virtual wall signal being the magnetic field strength and the predetermined number being 10 as an example, when 10 magnetic field strengths collected by the robot are all 800 Gauss, the traveling path fit by the robot is a direct line along the current traveling direction.

In block 702, when it is detected that the difference between the virtual wall signal and the second signal threshold is within a predetermined range, the robot is controlled to travel along the traveling path, and the traveling path is adjusted according to the virtual wall signal.

The predetermined range is a systemic predetermined value. When the difference between the virtual wall signal and the second signal threshold exceeds the predetermined range, the traveling path may be adjusted through the method illustrated in blocks 601-603 by the robot, which is not elaborated in embodiments.

Figure 8:
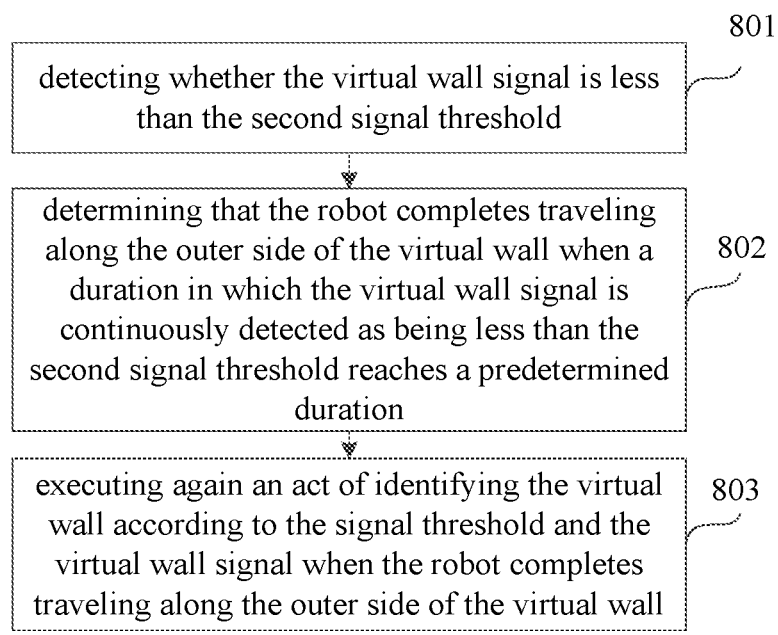
FIG. 8 is a flow chart illustrating a method for controlling a robot according to some other embodiments.

In some embodiments, the robot may travel for a circle rounding the region defined by the virtual wall. Or, as illustrated in FIGS. 5A-5C, when the robot travels along the virtual wall until the robot senses an obstacle, such as a real wall, it is determined that the robot completes traveling along the outer side of the virtual wall. The method may further include the followings, as illustrated in FIG. 8.

In block 801, it is detected whether the virtual wall signal is less than the second signal threshold.

In block 802, when it is detected that a duration in which the virtual wall signal is continuously detected as being less than the second signal threshold reaches a predetermined duration, it is determined that the robot completes traveling along the outer side of the virtual wall.

For example, it is detected that the virtual wall signal is less than the second signal threshold within 3 seconds, it is determined that the robot completes traveling along the outer side of the virtual wall.

In block 803, when the robot completes traveling along the outer side of the virtual wall, the act of identifying the virtual wall according to the signal threshold and the virtual wall signal is executed again.

When the robot completes traveling along the outer side of the virtual wall, in order to avoid a misjudgment, the first signal threshold having a relatively large value is used for identifying the virtual wall.

Therefore, with the method for controlling a cleaning robot provided in embodiments of the present disclosure, by setting two different signal thresholds, the virtual wall is identified according to the signal threshold and the virtual wall signal detected using the detection component during the traveling process of the robot. When the virtual wall is identified, the signal threshold is adjusted, and the robot is controlled to travel along the outer side of the virtual wall according to the adjusted signal threshold and the virtual wall signal. When the virtual wall is identified and the robot is controlled to travel along the outer side of the virtual wall, a different signal threshold is used. A problem that the driving wheel of the robot enters inside of the virtual wall when only a single large signal threshold is set, or user's interventions are required due to a misjudgment when only a single small signal threshold is set such that the robot cannot perform the cleaning operation automatically within a complex environment, may be solved. On the basis of accurate identification of the virtual wall, an effect may be realized that the driving wheel of the robot is located at the outer side of the virtual wall and does not enter an inner side of the virtual wall when the robot is traveling along the outer side of the virtual wall.

The terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "one implementation," "some embodiments," "some implementations," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a ROM, a RAM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

The features disclosed herein may be implemented as part of a smart home or a smart office design, which may implement individually or integrally various electronic devices in a home or office. For example, control or display functions described above may be realized on a mobile terminal such as a smart phone, or on a smart television Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Therefore, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A robot, comprising a controller configured to:
   detect a virtual wall signal;
   identify a virtual wall according to a signal threshold and the virtual wall signal; and
   when the virtual wall is identified, adjust the signal threshold from a first signal threshold to a second signal threshold that is less than the first signal threshold, and control the robot to travel along an outer side of the virtual wall according to the second signal threshold and the virtual wall signal, such that each driving wheel of the robot is located at the outer side of the virtual wall when the robot is traveling along the outer side of the virtual wall;
   wherein the outer side of the virtual wall is a side of the virtual wall within an active region of the robot.

2. The robot according to claim 1, wherein the controller is further configured to:
   control the robot to return back a predetermined distance and to travel along the outer side of the virtual wall when the virtual wall is identified; and
   adjust a traveling path of the robot according to a relation between the virtual wall signal and the second signal threshold when the robot is traveling along the outer side of the virtual wall.

3. The robot according to claim 2, wherein the controller is further configured to:
   detect whether the virtual wall signal reaches the second signal threshold;
   control the robot to travel away from the virtual wall when detecting that the virtual wall signal reaches the second signal threshold; and
   control the robot to travel towards the virtual wall when detecting that the virtual wall signal is less than the second signal threshold; or
   fit the traveling path according to a predetermined number of virtual wall signals collected, the traveling path being corresponding to a shape defined by the outer side of the virtual wall; and
   control the robot to travel along the traveling path and adjust the traveling path according to the virtual wall signal, when detecting that a difference between the virtual wall signal and the second signal threshold is within a predetermined range.

4. The robot according to claim 1, wherein the controller is further configured to:
   detect whether the virtual wall signal reaches the first signal threshold; and
   determine that the virtual wall is identified when detecting that the virtual wall signal reaches the first signal threshold.

5. The robot according to claim 1, wherein the controller is further configured to:
   execute again an act of identifying the virtual wall according to the signal threshold and the virtual wall signal when the robot completes traveling along the outer side of the virtual wall.

6. The robot according to claim 5, wherein the controller is further configured to:
   detect whether the virtual wall signal is less than the second signal threshold; and
   determine that the robot completes traveling along the outer side of the virtual wall when a duration in which the virtual wall signal is continuously detected as being less than the second signal threshold reaches a predetermined duration.

7. The robot according to claim 1, wherein the controller is further configured to:
   determine a maximum value of the virtual wall signal during the traveling process of the robot; and
   adjust the first signal threshold according to the maximum value of the virtual wall signal.

8. The robot according to claim 1, further comprising a detector including at least one of a magnetometer, a Hall sensor, or an infrared sensor.

9. The robot according to claim 8, wherein the detector is arranged behind a guide wheel of the robot with respect to a forward traveling direction.

10. The robot according to claim 1, wherein the robot is a cleaning robot.

11. A method for controlling a robot, comprising:
    detecting a virtual wall signal;
    identifying a virtual wall according to a signal threshold and the virtual wall signal; and
    adjusting the signal threshold from a first signal threshold to a second signal threshold that is less than the first signal threshold and controlling the robot to travel along an outer side of the virtual wall according to the second signal threshold and the virtual wall signal, when the virtual wall is identified, such that each driving wheel of the robot is located at the outer side of the virtual wall when the robot is traveling along the outer side of the virtual wall;
    wherein the outer side of the virtual wall is a side of the virtual wall within an active region of the robot.

12. The method according to claim 11, wherein the controlling the robot to travel along the outer side of the virtual wall according to the adjusted signal threshold and the virtual wall signal comprises:
    controlling the robot to return back a predetermined distance and to travel along the outer side of the virtual wall when the virtual wall is identified; and
    adjusting a traveling path of the robot according to a relation between the virtual wall signal and the second signal threshold when the robot is traveling along the outer side of the virtual wall.

13. The method according to claim 12, wherein the adjusting the traveling path of the robot according to the relation between the virtual wall signal and the second signal threshold comprises:
    detecting whether the virtual wall signal reaches the second signal threshold;
    controlling the robot to travel away from the virtual wall when detecting that the virtual wall signal reaches the second signal threshold; and
    controlling the robot to travel towards the virtual wall when detecting that the virtual wall signal is less than the second signal threshold; or
    fitting the traveling path according to a predetermined number of virtual wall signals collected, the traveling path being corresponding to a shape defined by the outer side of the virtual wall; and controlling the robot to travel along the traveling path and adjusting the traveling path according to the virtual wall signal, when detecting that a difference between the virtual wall signal and the second signal threshold is within a predetermined range.

14. The method according to claim 11, wherein the identifying the virtual wall signal according to the signal threshold and the virtual wall signal comprises:
   detecting whether the virtual wall signal reaches the first signal threshold; and
   determining that the virtual wall is identified when detecting that the virtual wall signal reaches the first signal threshold.

15. The method according to claim 11, further comprising:
   executing again an act of identifying the virtual wall according to the signal threshold and the virtual wall signal when the robot completes traveling along the outer side of the virtual wall.

16. The method according to claim 15, further comprising:
   detecting whether the virtual wall signal is less than the second signal threshold; and
   determining that the robot completes traveling along the outer side of the virtual wall when a duration in which the virtual wall signal is continuously detected as being less than the second signal threshold reaches a predetermined duration.

17. The method according to claim 11, further comprising:
   determining a maximum value of the virtual wall signal during the traveling process of the robot; and
   adjusting the first signal threshold according to the maximum value of the virtual wall signal.

18. A non-transitory computer readable storage medium, having instructions stored therein, wherein when the instructions are executed by a controller, a method for controlling a robot is executed, the method comprising:
   detecting a virtual wall signal via a detection component;
   identifying a virtual wall according to a signal threshold and the virtual wall signal during a traveling process of the robot; and
   adjusting the signal threshold from a first signal threshold to a second signal threshold that is less than the first signal threshold, and controlling the robot to travel along an outer side of the virtual wall according to the second signal threshold and the virtual wall signal, when the virtual wall is identified, such that each driving wheel of the robot is located at the outer side of the virtual wall when the robot is traveling along the outer side of the virtual wall;
   wherein the outer side of the virtual wall is a side of the virtual wall within an active region of the robot.

* * * * *